(12) United States Patent
Izumi

(10) Patent No.: US 9,490,896 B2
(45) Date of Patent: Nov. 8, 2016

(54) OPTICAL TRANSCEIVER, OPTICAL TRANSMISSION SYSTEM, AND LIGHT SOURCE OUTPUT MONITORING METHOD

(71) Applicant: FUJITSU LIMITED, Kawasaki-shi, Kanagawa (JP)

(72) Inventor: Futoshi Izumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/842,999

(22) Filed: Sep. 2, 2015

(65) Prior Publication Data
US 2016/0142136 A1    May 19, 2016

(30) Foreign Application Priority Data
Nov. 17, 2014   (JP) .................................. 2014-232846

(51) Int. Cl.
| | |
|---|---|
| H04B 10/00 | (2013.01) |
| H04B 10/079 | (2013.01) |
| H04B 10/40 | (2013.01) |
| H04B 10/564 | (2013.01) |

(52) U.S. Cl.
CPC ........ *H04B 10/07955* (2013.01); *H04B 10/40* (2013.01); *H04B 10/564* (2013.01)

(58) Field of Classification Search
CPC .................... H04B 10/07955; H04B 10/0795; H04B 10/40; H04B 10/564; H04B 10/0793
USPC ........... 398/33, 38, 135, 136, 137, 138, 139, 398/158, 159, 160, 162, 25, 26, 27, 30, 31, 398/32, 34, 37, 177, 181, 192, 195, 196, 398/197
See application file for complete search history.

(56) References Cited

U.S. PATENT DOCUMENTS

| | | | |
|---|---|---|---|
| 6,359,708 B1 * | 3/2002 | Goel | H04B 10/564 398/15 |
| 2004/0052524 A1 * | 3/2004 | Arnold | H04J 14/0221 398/38 |

FOREIGN PATENT DOCUMENTS

| | | |
|---|---|---|
| JP | 01-170243 | 7/1989 |
| JP | 07-231303 | 8/1995 |
| JP | 11-186963 | 7/1999 |
| JP | 2007-013434 | 1/2007 |
| JP | 2011-077586 | 4/2011 |

* cited by examiner

*Primary Examiner* — Hanh Phan
(74) *Attorney, Agent, or Firm* — Fujitsu Patent Center

(57) ABSTRACT

An optical transceiver includes: a light source; a light source power management unit configured to manage a state of an output power of the light source; an optical detector configured to receive a first optical signal from a counterpart optical transmission apparatus and detect the first optical signal; and a monitoring information extraction unit configured to extract a monitoring information of a reception power level of a second optical signal, which is generated from an output light of the light source and received in the counterpart optical transmission apparatus, from the first optical signal, wherein the light source power management unit is configured to update a written value of the state of the output power of the light source in a case where a monitored value of the reception power level included in the monitoring information is decreased to exceed a variation of an optical transmission path.

17 Claims, 20 Drawing Sheets

OPTICAL TRANSCEIVER, OPTICAL TRANSMISSION SYSTEM, AND LIGHT SOURCE OUTPUT MONITORING METHOD

CROSS-REFERENCE TO RELATED APPLICATION

This application is based upon and claims the benefit of priority from the prior Japanese Patent Application No. 2014-232846, filed on Nov. 17, 2014, the entire contents of which are incorporated herein by reference.

FIELD

The embodiments discussed herein are related to an optical transceiver, an optical transmission system, and a light source output monitoring method.

BACKGROUND

A vertical cavity surface emitting laser (VCSEL) array is used in an optical communication system. In the VCSEL, cost is suppressed while maintaining a high performance.

Related techniques are disclosed in, for example, Japanese Laid-Open Patent Publication No. 2007-13434.

SUMMARY

According to one aspect of the embodiments, an optical transceiver includes: a light source; a light source power management unit configured to manage a state of an output power of the light source; an optical detector configured to receive a first optical signal from a counterpart optical transmission apparatus and detect the first optical signal; and a monitoring information extraction unit configured to extract a monitoring information of a reception power level of a second optical signal, which is generated from an output light of the light source and received in the counterpart optical transmission apparatus, from the first optical signal, wherein the light source power management unit is configured to update a written value of the state of the output power of the light source in a case where a monitored value of the reception power level included in the monitoring information is decreased to exceed a variation of an optical transmission path.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In a VCSEL made of an inexpensive aluminum as a manufacturing material, an aluminum oxidation may occur. Further, since the VCSEL has a laminated structure of multi-layers, crystal defects may easily occur and a quality control may be difficult.

When the VCSEL is used as a light source, an output reduction of the VCSEL may occur due to, for example, an oxidization of aluminum or crystal defects. For this reason, an automatic power control (APC) is performed in which the output of the VCSEL is monitored by a monitor or an optical monitor and the drive current is controlled in order to make the output of the VCSEL constant. In the APC, since the drive current is automatically increased to compensate for the reduction of the light emission amount when the output is reduced, a "sudden death" (an abrupt deterioration of a device) may be induced.

For example, a pluggable optical module is provided in which the inexpensive VCSELs are arranged in an array to be accommodated compactly. A 10 Gbps optical signal is transmitted using each of 10 (ten) light sources arranged in an array, such that a high speed optical transmission of 100 Gbps is performed. Since the monitoring the outputs of the VCSEL light sources by corresponding optical monitors is difficult in terms of mounting, the optical monitors may be omitted. For example, in the VCSEL array, a constant current control is performed and operations may be performed without the APC.

For example, a reception side which has received an optical signal sent from a transmission side through an optical transmission path detects an abnormality in the optical transmission path based on a ratio of change in an input level of the light.

It may be difficult to arrange a configuration for monitoring all the outputs of the photodiodes within the pluggable optical module with increasing the number of light source arrays. Even though the limitations on the mounting of the optical monitors are removed, the cost for monitoring all the channels may be increased. Accordingly, in the VCSEL array, it is expected that the optical monitors are omitted and the constant current control is performed. However, information about the deterioration in the output level may not be obtained in real time due to omitting the optical monitors. The speed of the sudden death becomes slower according to the constant current control of the light source, but the deterioration of device is progressed. Therefore, a maintenance operation such as a detection of abnormality in the light source by a certain monitoring unit and a preventive replacement of the light source may be performed.

Figure 1:
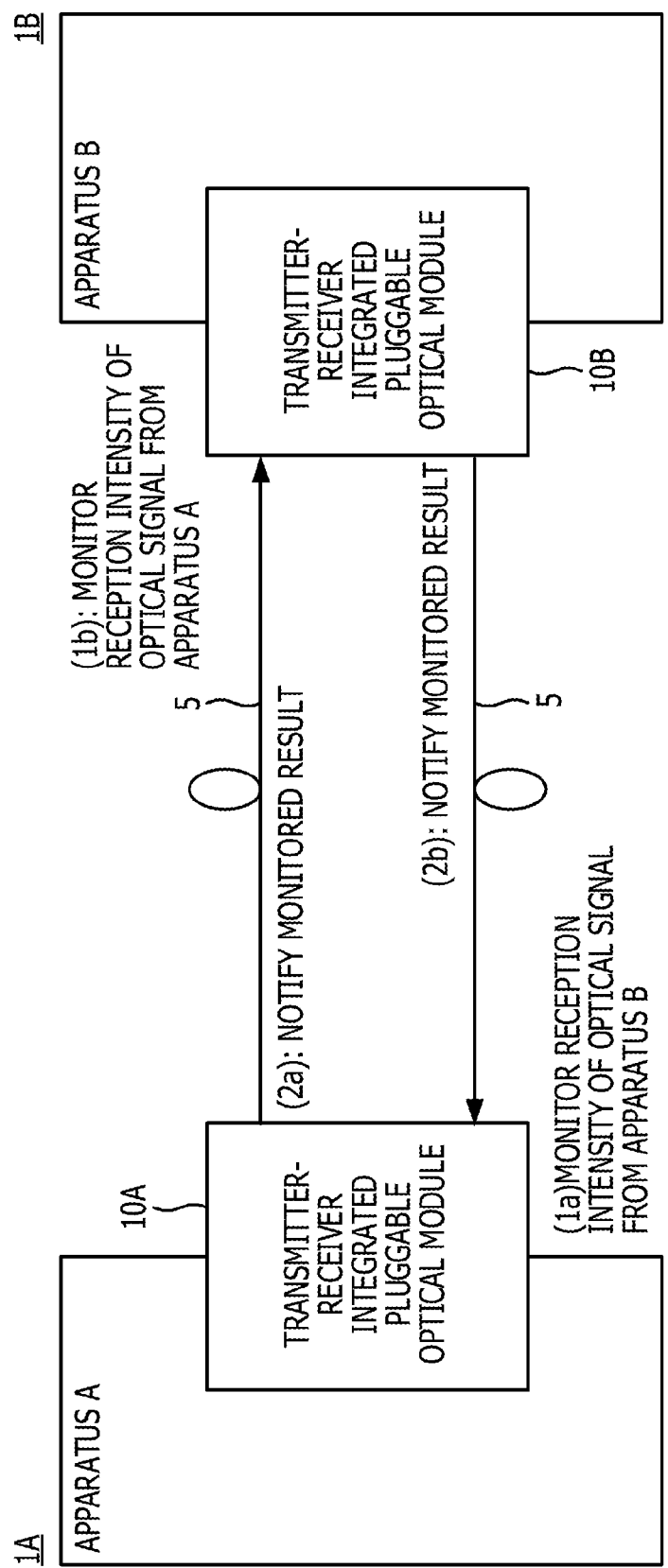
FIG. 1 illustrates an exemplary optical transmission system.

FIG. 1 illustrates an exemplary optical transmission system. In FIG. 1, an optical transmission system 100 using an optical transceiver 10 is illustrated. The optical transceiver 10 illustrated in FIG. 1 may be a pluggable optical module in which a transmitter and a receiver are integrally formed. An optical transceiver 10A and an optical transceiver 10B are detachably mounted on an optical transmission apparatus 1A and an optical transmission apparatus 1B, respectively. The optical transmission apparatus 1A and the optical transmission apparatus 1B are coupled with each other through an optical transmission path 5. The optical transmission path 5 may be an optical transmission cable such as a bidirectional and integrating MPO (Multi-fiber Push-On) cable.

In the optical transmission system 100, one of the optical transmission apparatuses 1A, 1B which are opposite to each other monitors a reception power of a signal received from the other of the optical transmission apparatuses 1A, 1B, and notifies a transmission side of the monitored result. The transmission side writes a deterioration state of an output power of the light source of its own device and manages the deterioration state based on the notified monitored result. The reception power is monitored without using a specific signal for measuring the reception power when a data signal is transmitted or received, and the monitored reception power is notified to the transmission side such that a change in the light source output of its own device is detected in the transmission side.

For example, the optical transceiver 10A monitors a reception intensity of the optical signal when the optical signal transmitted from the optical transmission apparatus 1B is received (Operation 1a), and notifies the optical transceiver 10B of the optical transmission apparatus 1B of the monitored result (Operation 2a). The optical transceiver 10B monitors a reception intensity of the optical signal when the optical signal transmitted from the optical transmission apparatus 1A is received (Operation 1b), and notifies the optical transceiver 10A of the optical transmission apparatus 1A of the monitored result (Operation 2b). The reception side may determine a deterioration degree of the light source of a counterpart apparatus based on the monitored result and notify the transmission side of the determined result. The reception side may notify the transmission side of only the monitored result, and a determination whether the output of the light source of its own device is deteriorated may be performed in the transmission side. In any of the configurations described above, the optical transceiver 10 writes the deterioration state of the output power of the light source of its own device and manages the deterioration state, based on the information notified from the reception side.

Figure 2:
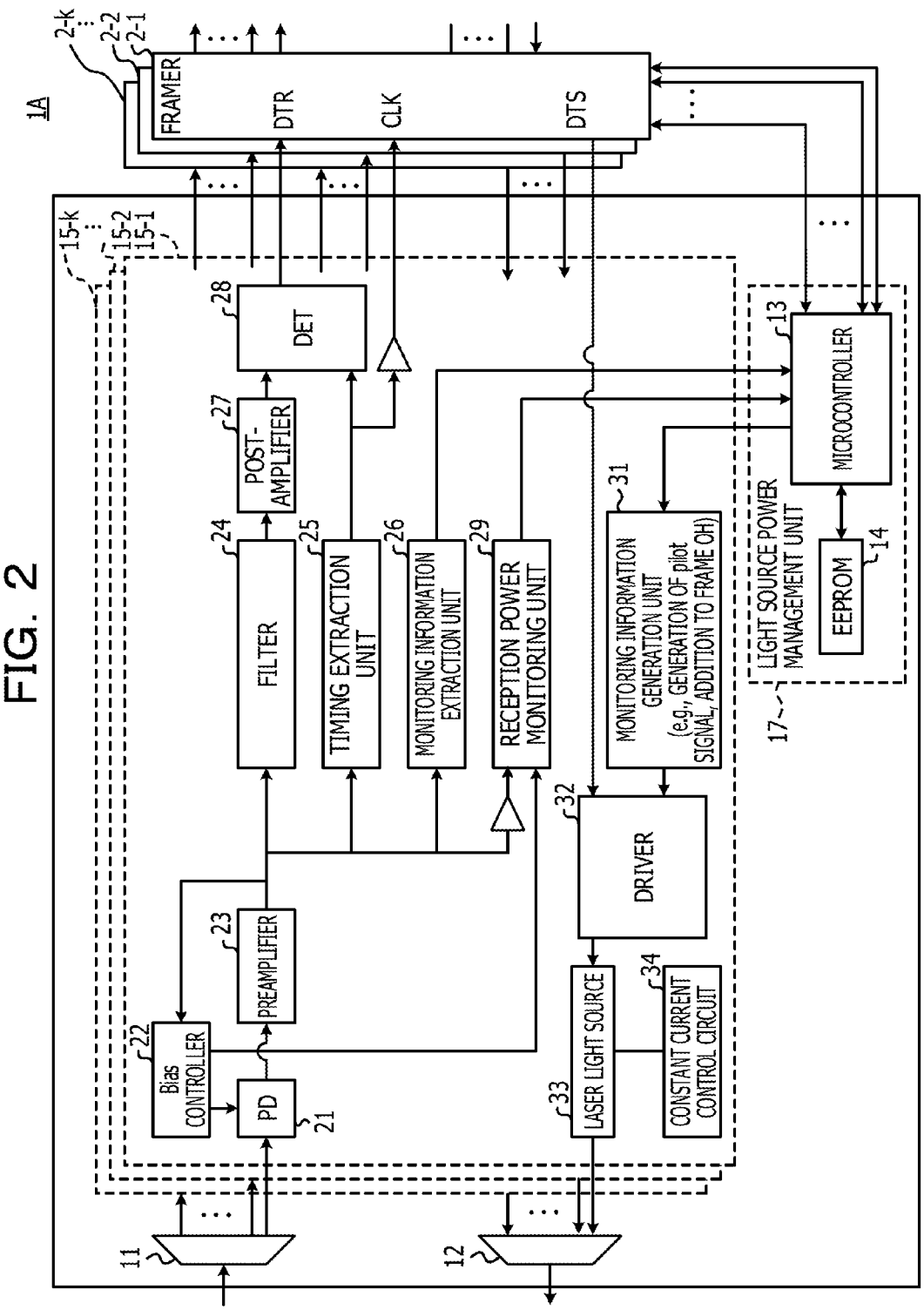
FIG. 2 illustrates an exemplary optical transceiver.

FIG. 2 illustrates an exemplary optical transceiver. The optical transceiver illustrated in FIG. 2 may be a pluggable optical module. For the convenience of explanation, it is assumed that the optical transceiver 10 is mounted on the optical transmission apparatus 1A and performs a transmission or reception of an optical signal with the optical transmission apparatus 1B. The optical transceiver 10 is used in, for example, an optical communication of a wavelength division multiplexing (WDM) system, and includes processing boards 15-1~15-k (may be accordingly referred to as a "processing board 15") corresponding to the wavelengths, and a light source power management unit 17 that collectively and comprehensively manages the output power levels of laser light sources 33 installed on the processing boards 15-1 to 15-k. The light source power management unit 17 includes a microcontroller 13 and a rewritable memory, for example, an electrically erasable programmable read-only memory (EEPROM) 14.

In a reception sequence of the optical transceiver 10, a WDM signal received from the optical transmission path 5 is separated into optical signals each having a different wavelength, by a de-multiplexer 11 and the optical signals are input into the corresponding processing boards 15. The received optical signals each having a different wavelength are detected by a photodiode (PD) 21 and amplified by a preamplifier 23. A data signal, a clock signal, and a pilot signal are contained in the received signal.

The data signal among the amplified signals passes through a filter 24 such that a certain band or a certain frequency component of the data signal is extracted, and the data signal is amplified by a post-amplifier 27 to be input to a signal detector 28. The clock signal is extracted by a timing extraction unit 25 to be input to the signal detector 28. The signal detector 28 detects data based on the clock signal and outputs the detected data to a corresponding framer among framers 2-1 to 2-k installed in the optical transmission apparatus 1A. Each of the framers 2-1 to 2-k extracts each client signal from frames in compliance with a communication network standard such as the optical transport network (OTN) and outputs the client signal.

Monitoring information included in the received signal is extracted by a monitoring information extraction unit 26 and input to the microcontroller 13. The monitoring information includes a monitored reception power value of the optical signal transmitted from the optical transmission apparatus 1A and received in the optical transmission apparatus 1B, and identification information of the optical transmission apparatus 1B of the transmission side. The monitored reception power value may be a measured reception power level, a difference between the current monitored value and the previously notified monitored value, or a deterioration quantity compared to an initial output power level at the time of shipment of the optical transmission apparatus 1A. The monitoring information may include the identification information of the optical transmission apparatus 1A itself exchanged before the signal communication is made. The monitoring information may be superimposed a main signal as a pilot signal, and may be notified using an empty byte such as an overhead area of a signal frame.

A portion of the received signal of the optical transmission apparatus 1A is branched and the reception power level is monitored by a reception power monitoring unit 29. An output of a bias controller 22 which controls a bias of the photodiode 21 is also input to the reception power monitoring unit 29. The reception power monitoring unit 29 includes an analog/digital converter. The monitored result is input to the microcontroller 13. The microcontroller 13 writes the deterioration state in the output power of the laser light source 33 of its own device for example, the optical transmission apparatus 1A, in an EEPROM 14 based on the monitoring information included in the pilot signal received from a counterpart apparatus, for example, the optical transmission apparatus 1B, or the overhead area of the frame.

In a transmission sequence of the optical transceiver 10, each of the client signals converted into a prescribed frame format by each of the framers 2-1 to 2-k of the optical transmission apparatus 1A is supplied to each of the processing boards 15-1 to 15-k for each wavelength. The client signal (data signal) is input to the driver 32 to drive the laser light source 33. The laser light source 33 may be subjected to a constant current control by a constant current control circuit 34 so as to reduce a change in the current injected into the laser, and a feedback control such as the APC may not be performed on the laser light source 33.

A monitoring information generation unit 31 generates the monitoring information based on the reception power level of the optical signal from the optical transmission apparatus 1B when the client signal is transmitted. The monitoring information may be superimposed with the generated pilot signal which corresponds to the main signal. The monitoring information may be notified using an empty byte such as an overhead area of a signal frame, instead of using the pilot signal. In a case where the monitoring information is to be notified by using the empty byte, the monitoring information of the reception power is sent by the microcontroller 13 to the framer 2 and provided through a frame termination processing function of the framers 2-1 to 2-k. The monitoring information of the counterpart apparatus is also provided from the framers 2-1 to 2-k to the microcontroller 13.

In the optical transceiver 10, when an accumulated value of the deterioration quantity in the output of the laser light source 33 exceeds a threshold value, an alarm may occur. Further, even though an automatic power mechanism is not installed, a maintenance such as an exchange of light source according to a deterioration state may be made while the life span of the laser light source 33 is maintained for a long time.

Figure 3:
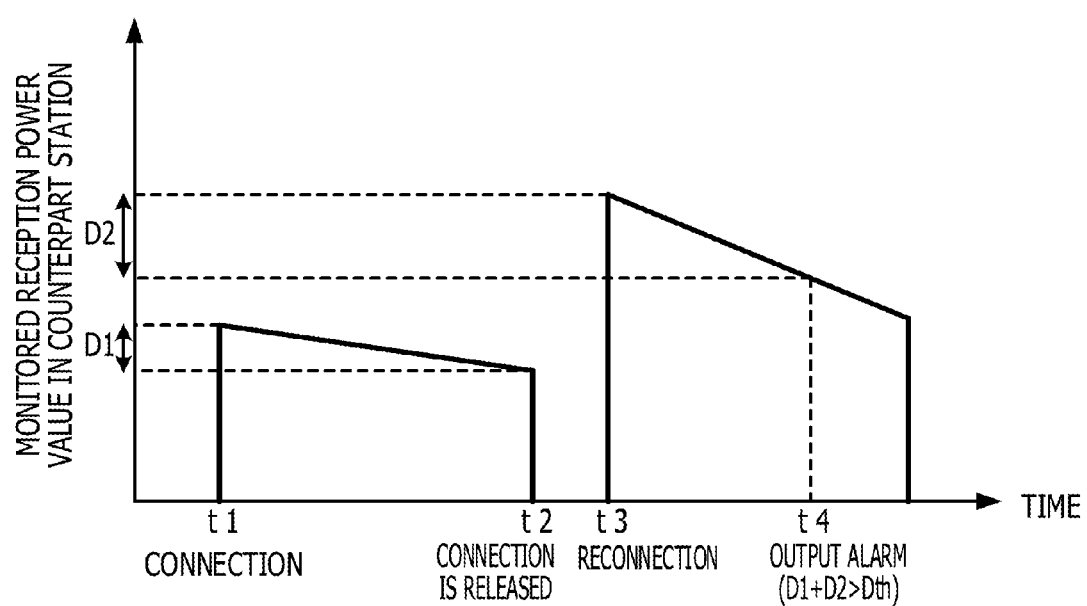
FIG. 3 illustrates an example of a light source deterioration monitoring.

FIG. 3 illustrates an example of a light source deterioration monitoring. In FIG. 3, the monitoring of a deterioration of the light source is performed based on the reception power monitoring information. The optical transceiver 10A mounted on the optical transmission apparatus 1A monitors the deterioration of the laser light source 33 of its own device based on the reception power monitoring information received from the optical transmission apparatus 1B. An optical connection between the optical transmission apparatus 1A and the optical transmission apparatus 1B may be released and the optical transceiver 10 of the optical transmission apparatus 1B which is a counterpart apparatus may be replaced. For example, when a signal communication for the connection between the optical transmission apparatus 1A and the optical transmission apparatus 1B is confirmed at time t1, the optical transceiver 10A makes a monitored reception power value received from the optical transmission apparatus 1B valid and writes the value in the EEPROM 14 as an initial power level right immediately after the connection. Then, at time t2 where the connection is released, the monitored reception power value sent from the optical transmission apparatus 1B, for example, the output level of the light source of the optical transmission apparatus 1A is lowered from the initial power level by D1.

Then, a reconnection is performed at time t3. In this time, a transmission loss of the optical transmission path 5 is likely to change as compared to the transmission loss at time t2, and the monitored reception power value received at time t3 may become larger than the initial power level at time t1. The optical transceiver 10 of the optical transmission apparatus 1A sequentially writes a deterioration quantity D2, which amounts to a deteriorated quantity compared to the monitored reception power value received at time t3, in the EEPROM 14. For example, when the transmission loss is not changed after the time t3, an alarm occurs at time t4 at which the accumulated deterioration quantity "D1+D2" exceeds a value Dth (D1+D2>Dth).

The microcontroller 13 sequentially writes the monitored reception power value received from the optical transmission apparatus 1B as the counterpart apparatus in the EEPROM 14 and also computes the accumulated deterioration quantity of the monitored reception power value, for example, the accumulated deterioration quantity of the output power of the laser light source 33 of the optical transmission apparatus 1A, and writes the accumulated deterioration quantity in the EEPROM 14.

For a case where the monitored reception power value at time t4 is larger than the initial power level at time t1, the erroneous determination by the microcontroller 13 that a deterioration of the laser light source 33 does not occur may be reduced.

Figure 4A:
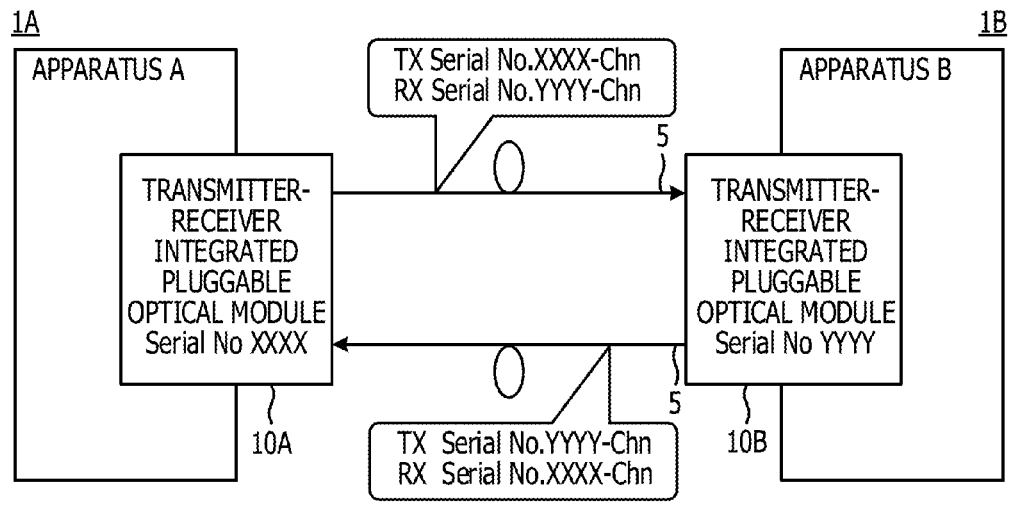
FIG. 4A and FIG. 4B illustrates an example of a link establishment procedure.
Figure 4B:
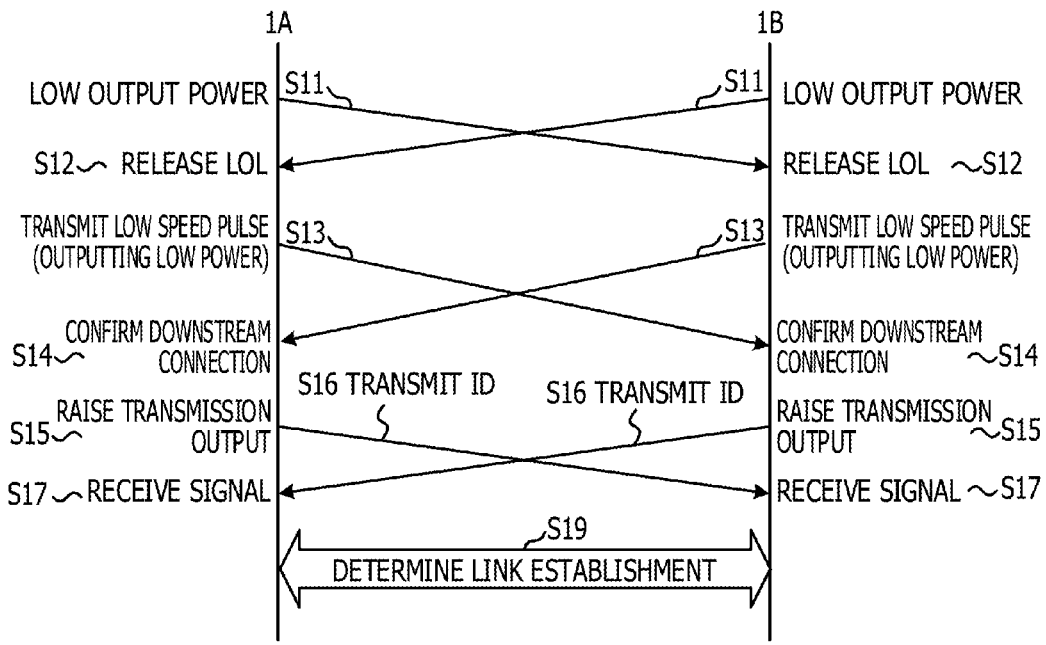

FIG. 4A and FIG. 4B illustrates an example of a link establishment procedure. In FIG. 4A and FIG. 4B, the link establishment process performed before the monitoring information is exchanged is illustrated. The optical transceiver 10 writes the extent the output power level of the laser light source 33 of its own device is reduced from the initial state in the EEPROM 14 based on the received monitoring information. For example, due to the erroneous connection of the cable, incorrect information, for example, the monitored reception power value for a separate apparatus may be written in the EEPROM 14. In order to reduce the writing of the incorrect information, the monitoring of the reception power may be initiated between the optical transmission apparatus and the counterpart optical transmission apparatus after the bidirectional connection with the counterpart optical transmission apparatus is certainly established and the link is determined. The identification information may be transmitted using a trace byte or by being included in the pilot signal.

For example, as illustrated in FIG. 4A, the optical transceiver 10A of the optical transmission apparatus 1A and the optical transceiver 10B of the optical transmission apparatus 1B exchange their equipment IDs with each other in advance, and notify the identification information of the counterpart apparatus and the identification information of its own device to be included in the monitoring information to each other when transmitting the monitoring information. The optical transmission apparatus that received the monitoring information compares the received identification information with that stored in its own device in order to determine whether an erroneous connection exists.

In the connection sequence of FIG. 4B, the optical transmission apparatus 1A and the optical transmission apparatus 1B transmit the optical signal with each other at a low output power before establishing the link (S11). When the optical signal having a low output power is received from the counterpart optical transmission apparatus, the optical transmission apparatuses releases a loss of synchronization (LOL; Loss of Light) (S12), and notifies the counterpart optical transmission apparatus of the reception of the optical signal by a low speed pilot modulation (S13). The optical transmission apparatus receives a low speed pulse signal (pilot signal) from the counterpart apparatus so as to confirm a downstream connection (S14), raises a transmission output power (S15), and transmits the identification information of its own device (S16). For example, the optical transceiver 10A of the optical transmission apparatus 1A transmits a production number (XXXX-Chn) of its own device and receives a production number (YYYY-Chn) of the optical transceiver 10B from the counterpart optical transmission apparatus 1B (S17). When the link establishment is determined between the optical transmission apparatus 1A and the optical transmission apparatus 1B (S19), the optical signal is transmitted/received, the reception power level is measured, and the monitoring information is notified. When the monitoring information is notified, the identification information of its own device and the identification information of the counterpart apparatus may be included in the monitoring information as illustrated in FIG. 4A.

As described above, a connection counterpart is confirmed before the link is established and the monitoring information of the reception power may be notified to the transmission side together with the identification information of the counterpart apparatus after the optical link is established.

Figure 5:
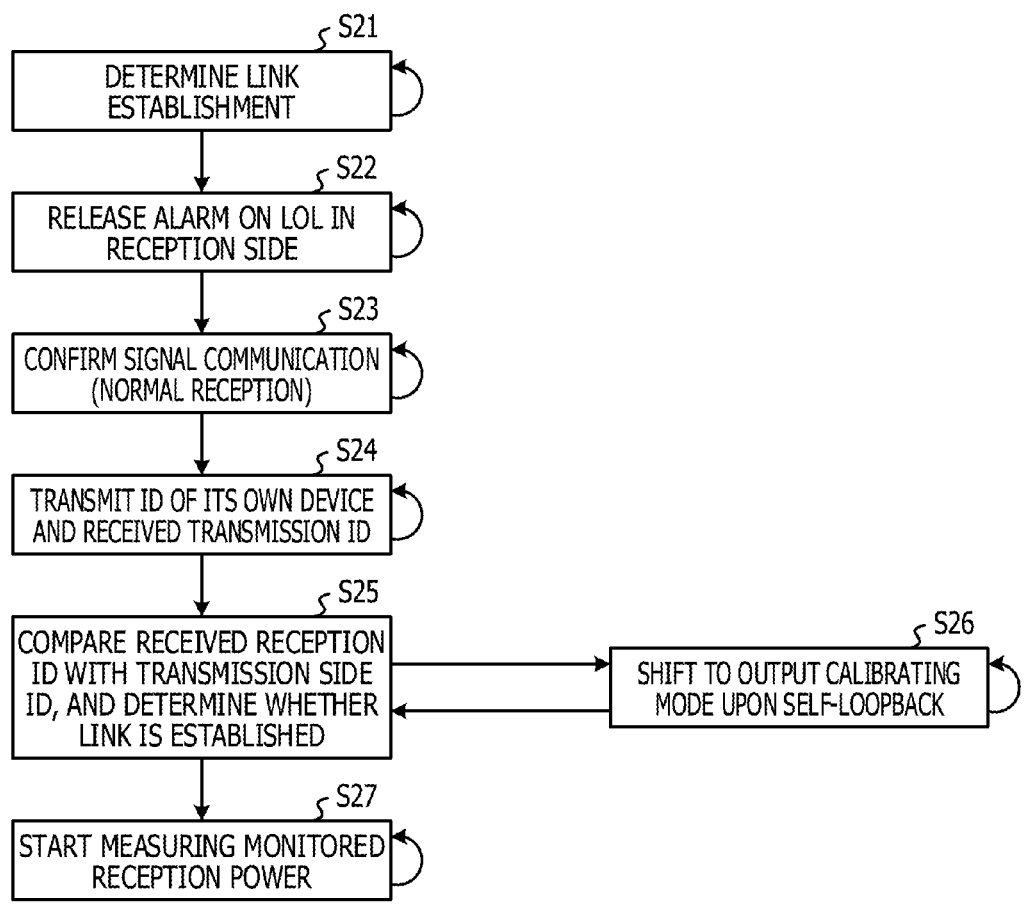
FIG. 5 illustrates an example of a light source output monitoring method.

FIG. 5 illustrates an example of a light source output monitoring method. When a normal start-up of the optical transmission apparatus 1A is completed (S21), an alarm on the loss of synchronization (LOL) is released in the reception sequence of the optical transceiver 10 (S22). When a multi-stage output level control is performed on the light source, a low power output is maintained when the normal start-up is completed. Due to the release of the LOL alarm, the pilot signal of the low speed pulses and the identification information are supplied from the counterpart optical transmission apparatus 1B. Accordingly, a signal communication is confirmed and the output level is raised (S23). Then, the identification information of the optical transceiver 10A of its own device and the identification information of the counterpart optical transmission apparatus 1B received at S23 are transmitted (S24). The identification information of the optical transceiver 10B and the identification information transmitted by its own device 1A are received from the optical transmission apparatus 1B, and the received identification information of the optical transceiver 10A is compared with the identification information transmitted by the optical transmission apparatus 1A to determine whether the link is established (S25). When it is determined that the identification information of the counterpart optical transmission apparatus 1B received at S24 is identical with the identification information transmitted by its own device (e.g., optical transmission apparatus 1A), the connection with the counterpart optical transmission apparatus is not made and the connection is shifted to a self-loopback mode (S26). In this case, since the output power of the laser light source 33 of its own device is measured in the photodiode 21 and the reception power monitoring unit 29 in the reception sequence of the optical transceiver 10A, the deterioration quantity of the output power written in the EEPROM 14 is corrected. When the link is established at S25, measuring the reception power level of the optical signal transmitted from the counterpart optical transmission apparatus 1B is started (S27).

The deterioration quantity of the reception power level is updated to be written into the EEPROM 14 of the transmission side. In order to distinguish the reduction of the output of the light source caused by performing the optical communication over the reduction of the reception power caused by the increase in the transmission path loss caused by, for example, removal of the transmission path cable, the deterioration quantity may be updated in a state where the link is established.

When the optical transceiver 10B of the transmission side determines whether the output power of the light source is deteriorated, the optical transceiver 10A of the reception side notifies the optical transmission apparatus 1B of the monitored value of reception power at all times or regular intervals. When the optical transceiver 10A of the reception side determines whether the output power of the light source of the counterpart optical transmission apparatus 1B is deteriorated, the optical transceiver 10A may notify the optical transmission apparatus 1B as the counterpart apparatus by, for example, performing averaging on the measured reception power levels and determining that the output power of the light source is deteriorated at the time when the reduction of the reception power exceeding a certain amount is continued for a certain period of time.

Figure 6:
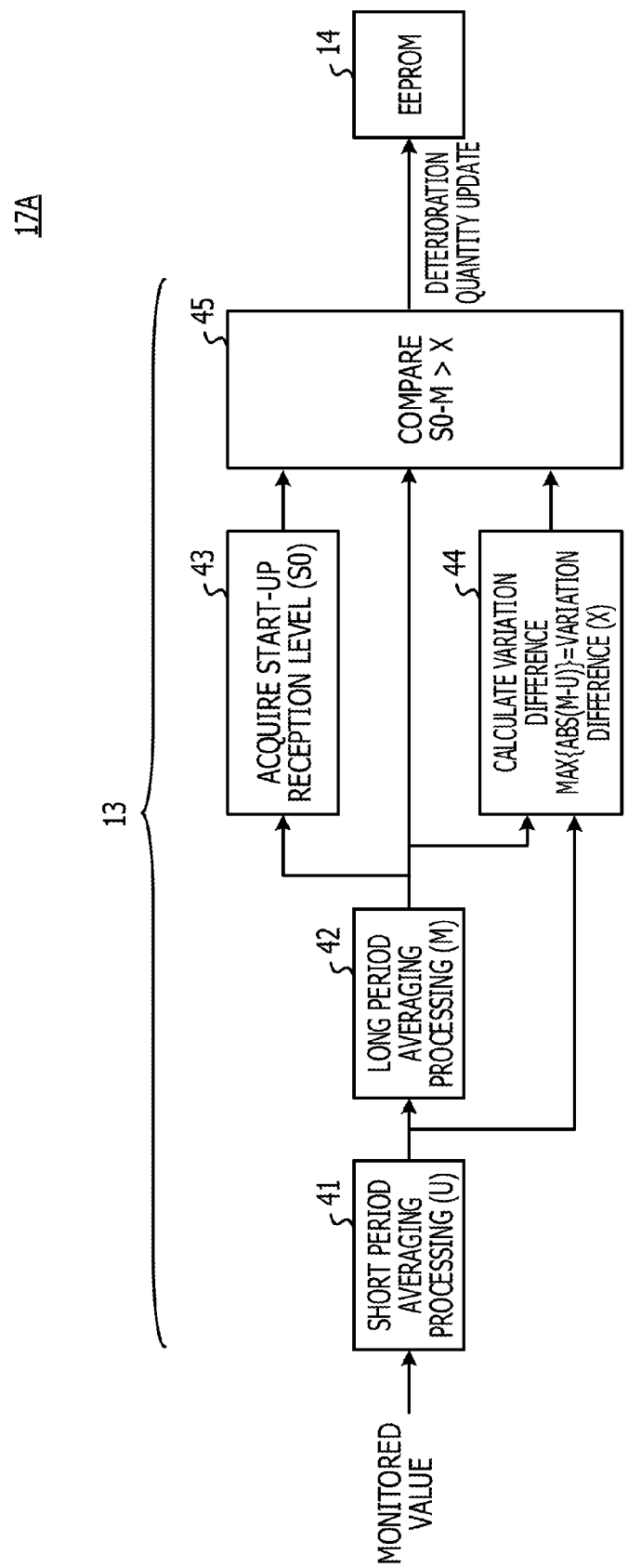
FIG. 6 illustrates an example of a deterioration quantity updating of the light source output power.

FIG. 6 illustrates an example of a deterioration quantity updating of a light source output power. In FIG. 6, the updating of the deterioration quantity by a light source power management unit 17A of the optical transceiver 10 is illustrated. The microcontroller 13 including the light source power management unit 17A includes a short period averaging processing unit 41, a long period averaging processing unit 42, a start-up reception level acquisition unit 43, a variation difference calculation unit 44, and a comparison unit 45. The short period averaging processing unit 41 averages the monitored value received from the monitoring information extraction unit 26 (in a case of determining at the transmission side), or the monitored value received from the reception power monitoring unit 29 (in a case of determining at the reception side) with a short period to obtain a short period average U. The long period averaging processing unit 42 averages the short period averages U over a certain period of time to obtain a long period average M. The short period variation in the reception power may be caused by, for example, the variation of polarization and the long period variation may include, for example, a seasonal variation.

The variation difference calculation unit 44 calculates a value, by which an absolute value of the difference between the short period average U and the long period average M becomes the maximum value within a certain period of time, as a variation difference X. The start-up reception level acquisition unit 43 acquires a reception power level S0 at the time of the start-up from the EEPROM 14.

When the difference between the reception power level S0 at the time of the start-up and the long period average M of the monitored reception power value becomes larger than the variation difference X (S0−M>X), the comparison unit 45 writes a new deterioration quantity in the EEPROM 14. For example, when the pluggable optical transceiver 10 is repetitively attached and detached, the erroneous determination where the variation of the transmission path is regarded as the deterioration of the output power level may be reduced.

Figure 7:
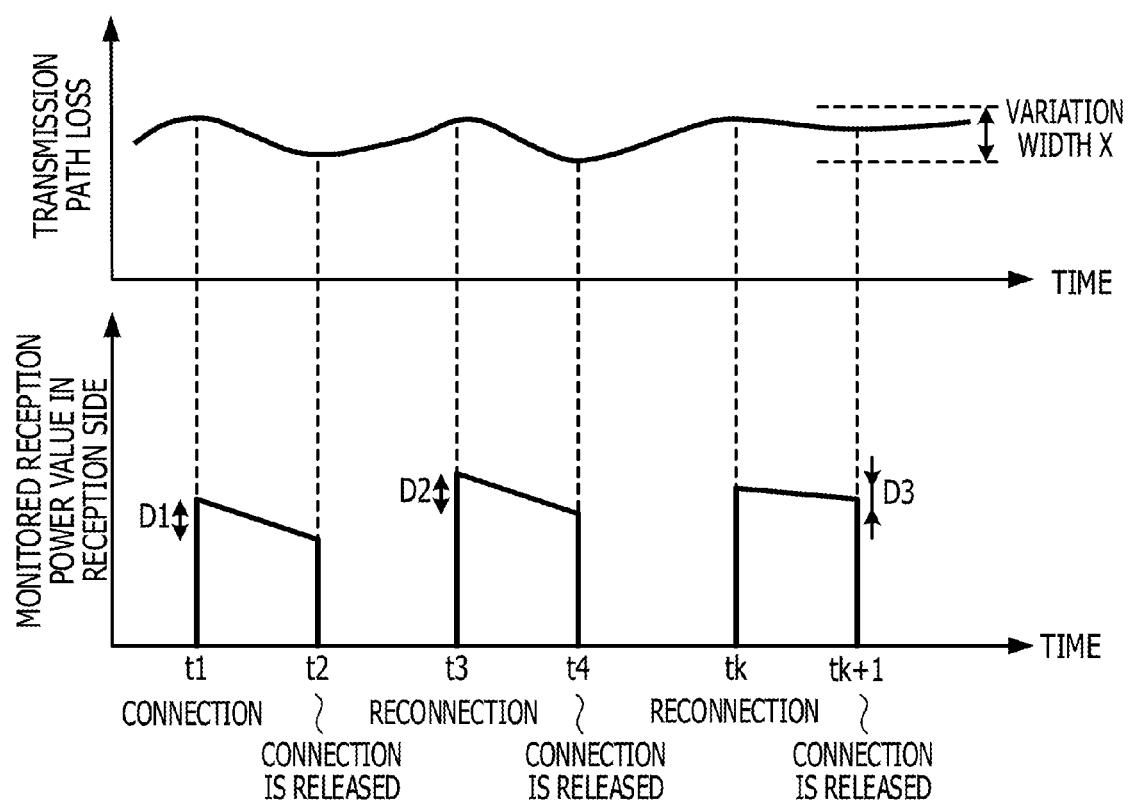
FIG. 7 illustrates an example of an erroneous determination prevention.

In FIG. 7, for example, the erroneous determination when the attachment or detachment of the optical transceiver 10 is repeated is reduced. A deterioration quantity D3 occurred when the optical transceiver 10 is reconnected at time "tk" and disconnected at time "tk+1" is smaller than the variation width "X" of the transmission path. In this case, the deterioration of the monitored reception power value may be caused by an influence of the variation of the transmission path rather than the deterioration of the light source itself. In this case, when the deterioration quantity D3 is added to the accumulated deterioration quantity, the deterioration quantity of the output of the light source to be written may become larger than an actual deterioration of the output of the light source. Accordingly, when the reduction of a long period average reception power from the reception power level S0 at the time of the start-up is larger than the variation width X (e.g., 0.3 dB to 1 dB), an addition of deterioration quantity to the accumulated deterioration quantity is performed, whereas, when the deterioration quantity falls within a range of the variation width, the addition is not performed. Therefore, the erroneous determination may be reduced.

The optical transceiver 10 of a reception power monitoring side may notify the transmission side optical transmission apparatus of the monitored result and the deterioration quantity of the reception power being monitored is reset to zero in the transmission side optical transmission apparatus at the time when the deterioration quantity is written in the EEPROM 14.

Figure 8:
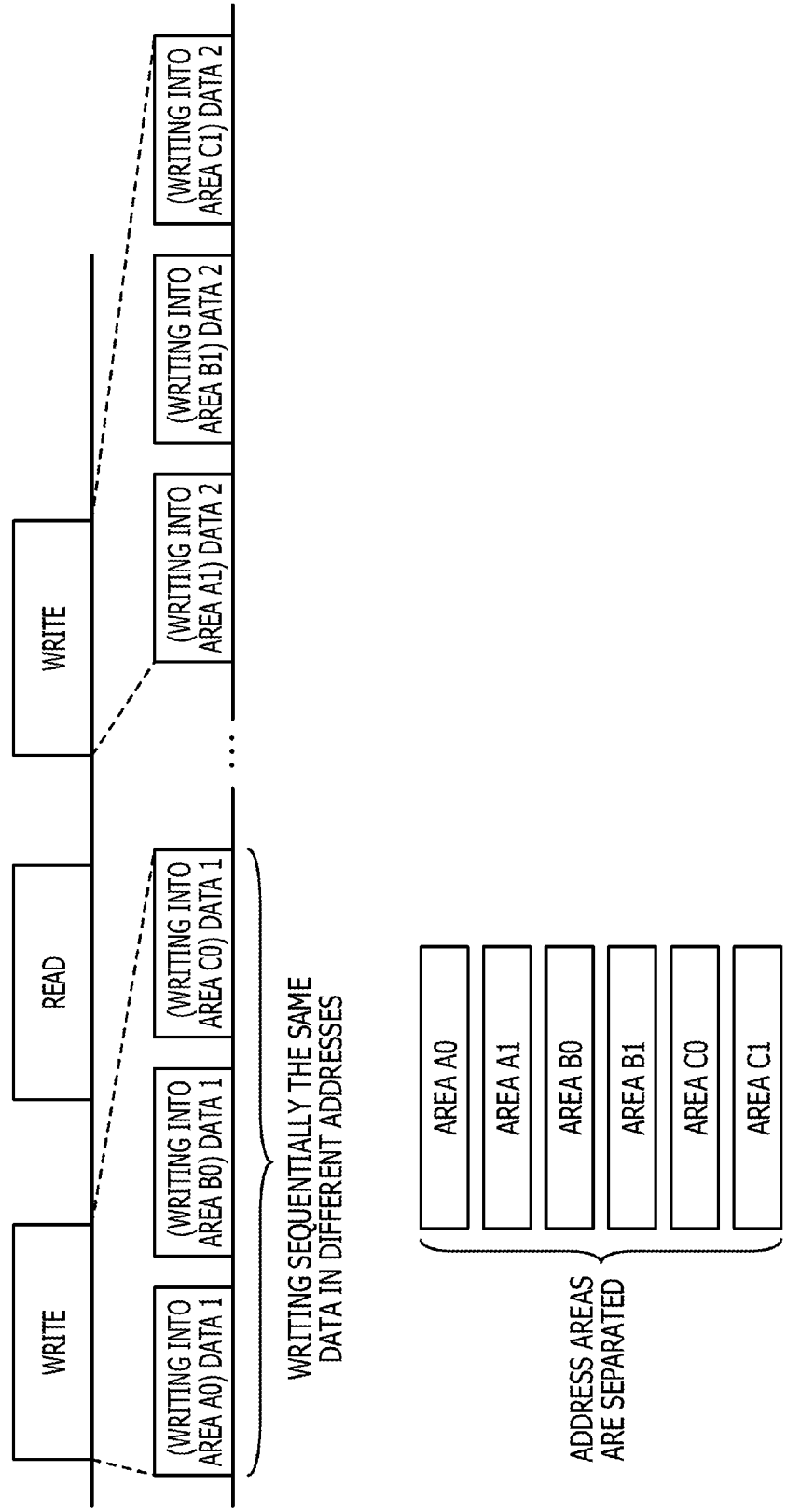
FIG. 8 illustrates an example of writing in a memory.

FIG. 8 illustrates an example of writing in a memory. In FIG. 8, writing in the EEPROM 14 is illustrated. Since data are destroyed when the power source is disconnected during the writing in the EEPROM 14, a plurality of write areas of the EEPROM 14 such as, for example, address area A0, A1, B0, B1, C0, and C1 are prepared and the writing is performed by cyclically switching the addresses each time when the deterioration quantity of the output power of the light source is updated. The value to be written at the same time is written in a plurality of addresses A0, B0, and C0 and a value to be written at the next time is written in a plurality of different addresses A1, B1, and C1. When the values written in the plurality of addresses used for a write are not identical with one another, information written at the previous timing is used. Accordingly, a recording of the state of the output power of the light source may be maintained even when the power source is disconnected during the writing.

Figure 9:
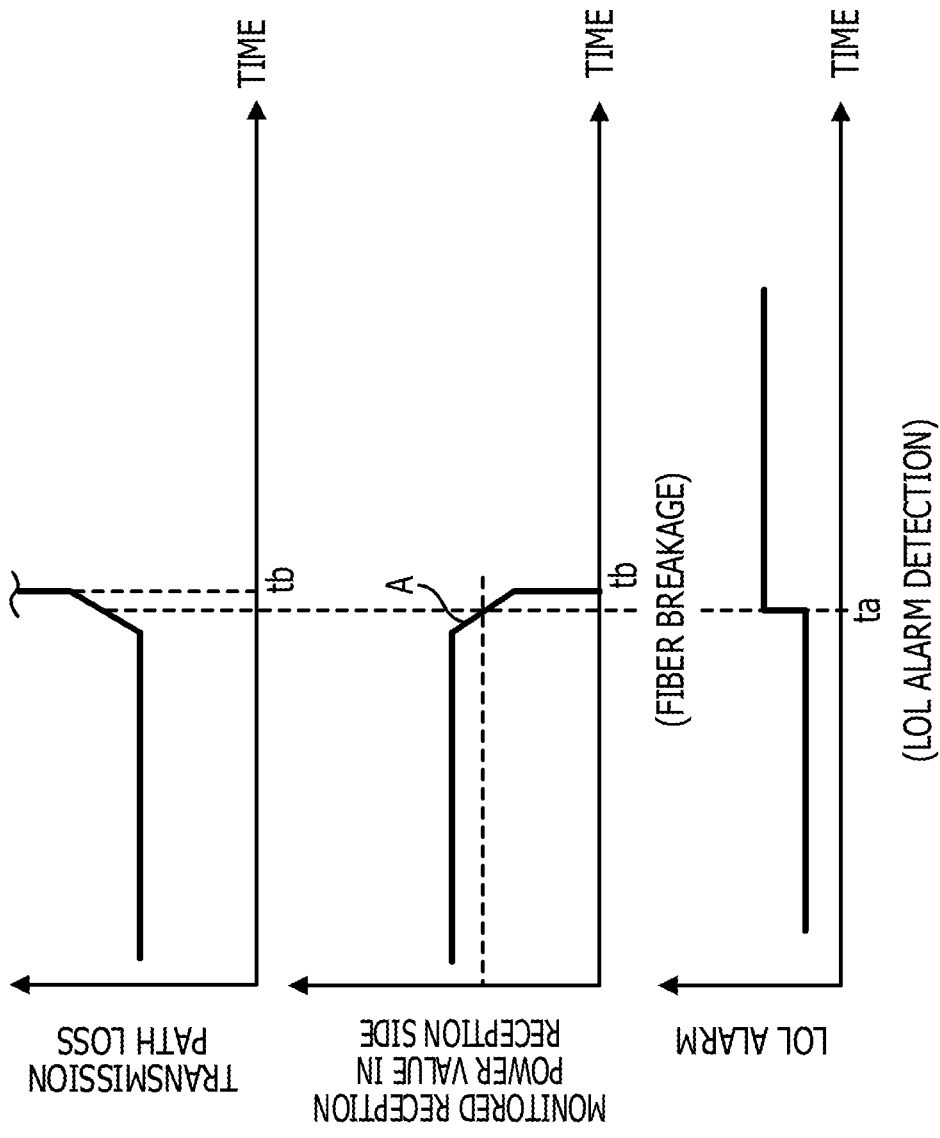
FIG. 9A, FIG. 9B and FIG. 9C are illustrate an example of a malfunction reduction.

FIG. 9A, FIG. 9B and FIG. 9C illustrates an example of reducing a malfunction. In FIGS. 9A, 9B, and 9C, an example of reducing a malfunction when the transmission path is disconnected is illustrated. For example, as illustrated in FIG. 9A, in a case where the transmission path is disconnected due to, for example, a breakage of an optical fiber, the transmission path loss gradually increases during the breakage and abruptly becomes infinite at time "tb" where the transmission path is completely disconnected. As illustrated in FIG. 9B, the monitored reception power value gradually decreases during the breakage and abruptly falls down to zero at time "tb" where the transmission path is completely broken. As illustrated in FIG. 9C, the same phenomenon as FIG. 9A and FIG. 9B occurs also in a case where the pluggable optical transceiver 10 is slowly pulled out.

A case where the reception power is deteriorated to exceed a certain level (e.g., 3 dB to 5 dB) within a certain period of time is not regarded as the deterioration of the light source and the addition of the deterioration quantity to the accumulated deterioration quantity is not performed. For example, since the loss of synchronization (LOL) occurs at all channels when the transmission path is disconnected, an LOL alarm is turned ON and the addition of the deterioration quantity to the accumulated deterioration quantity is stopped at time "ta" where the deterioration quantity of reception power per a predetermined time exceeds the threshold value, as illustrated in FIG. 9C. For example, in a case of the MPO cable, since all the light sources arranged in an array are disconnected, an abrupt reduction of the reception power is disregarded such that an erroneous determination is reduced. Since the VCSEL array is a set of a plurality of light sources and the same transmission path cable is used for the plurality of light sources, it is distinguished in an entire array whether it is the deterioration of transmission path or the deterioration of light source.

Figure 10:
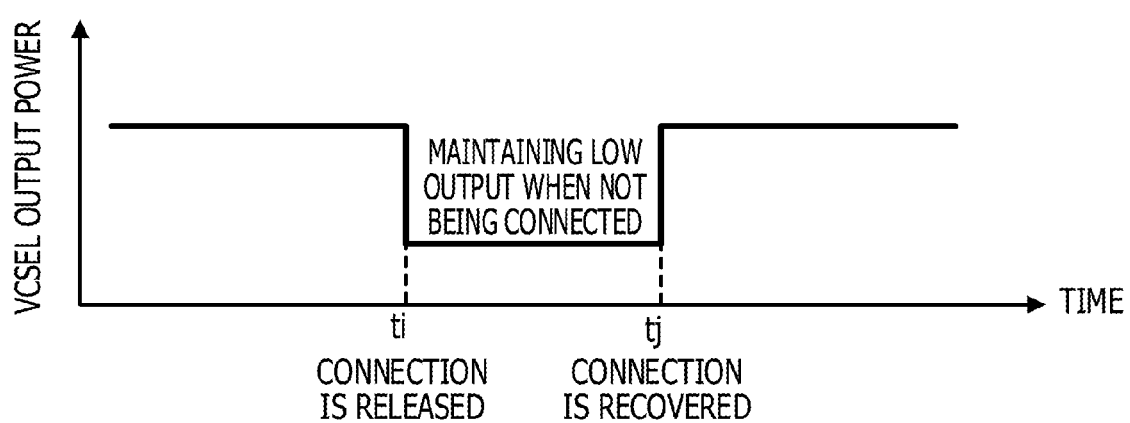
FIG. 10 illustrates an example of the light source deterioration monitoring when an optical transceiver is not coupled.

FIG. 10 illustrates an example of monitoring a deterioration of the light source when an optical transceiver is not coupled. When the light source is turned OFF in a case where the optical transceiver 10 is pulled out, the connection of the optical transceiver is not confirmed until the start-up is completed next and the measurement timing for the reception power may be delayed. For this reason, the power of the laser light source 33 is maintained in a lower output at a state of not being connected (a period ranging from time ti to time tj) and certain currents are allowed to flow at the time when the connection is recovered. The power of the light source is maintained at a lower output at the time when the optical transceiver is not connected such that the deterioration caused by the currents is suppressed and the deterioration of the reception power may be quickly detected at the time of the connection.

Figure 11:
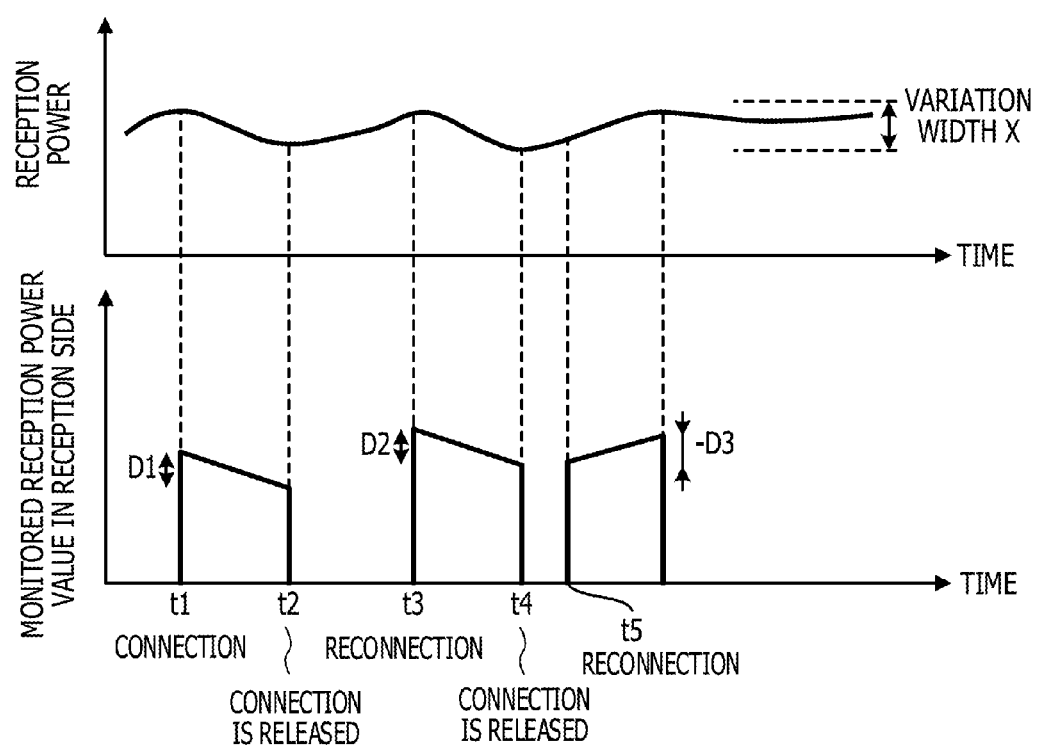
FIG. 11 illustrates another example of the malfunction reduction.

FIG. 11 illustrates an example of reducing a malfunction. In FIG. 11, reducing the malfunction for a case where the transmission path loss varies is illustrated. As illustrated in FIG. 11, when the connection and disconnection are repeated, the monitored reception power value may become larger than the reception power value right after being connected, depending on a state of the transmission path. For example, when the state of transmission path is improved after being reconnected at time t5 such that the loss is reduced, the monitored reception power value becomes larger than the monitored reception power value at time t5. When the reception power becomes higher, the deterioration quantity or a difference between the current monitored reception power value and the previously notified monitored value is represented by a negative value. For example, since the optical transceiver 10A which has received the optical signal represents a negative binary number, the optical transceiver 10A notifies the optical transceiver 10B of the transmission side of the monitored reception power value using two's complement. When the negative monitored value is received, the optical transceiver 10B may subtract the monitored value from the accumulated deterioration quantity in which the deterioration quantity has been accumulated up to this time. This method is valid for a case where the variation in the long period is comparatively short. When a negative value less than or equal to the certain predetermined value is received, for example, when the reception power is increased by a certain width or more, the deterioration quantity may not be updated by regarding the deterioration is not the deterioration of the output of the light source but is caused by the influence of the variation of transmission path.

The optical transceiver 10A of the reception side may update the initial reception power level at the time of the connection with the current monitored value at the time when the negative reception power level is measured. The optical transceiver 10A of the reception side may average the initial reception power level at the time of the connection and the detected negative monitored value, for example, the value when the reception power level is increased.

Figure 12:
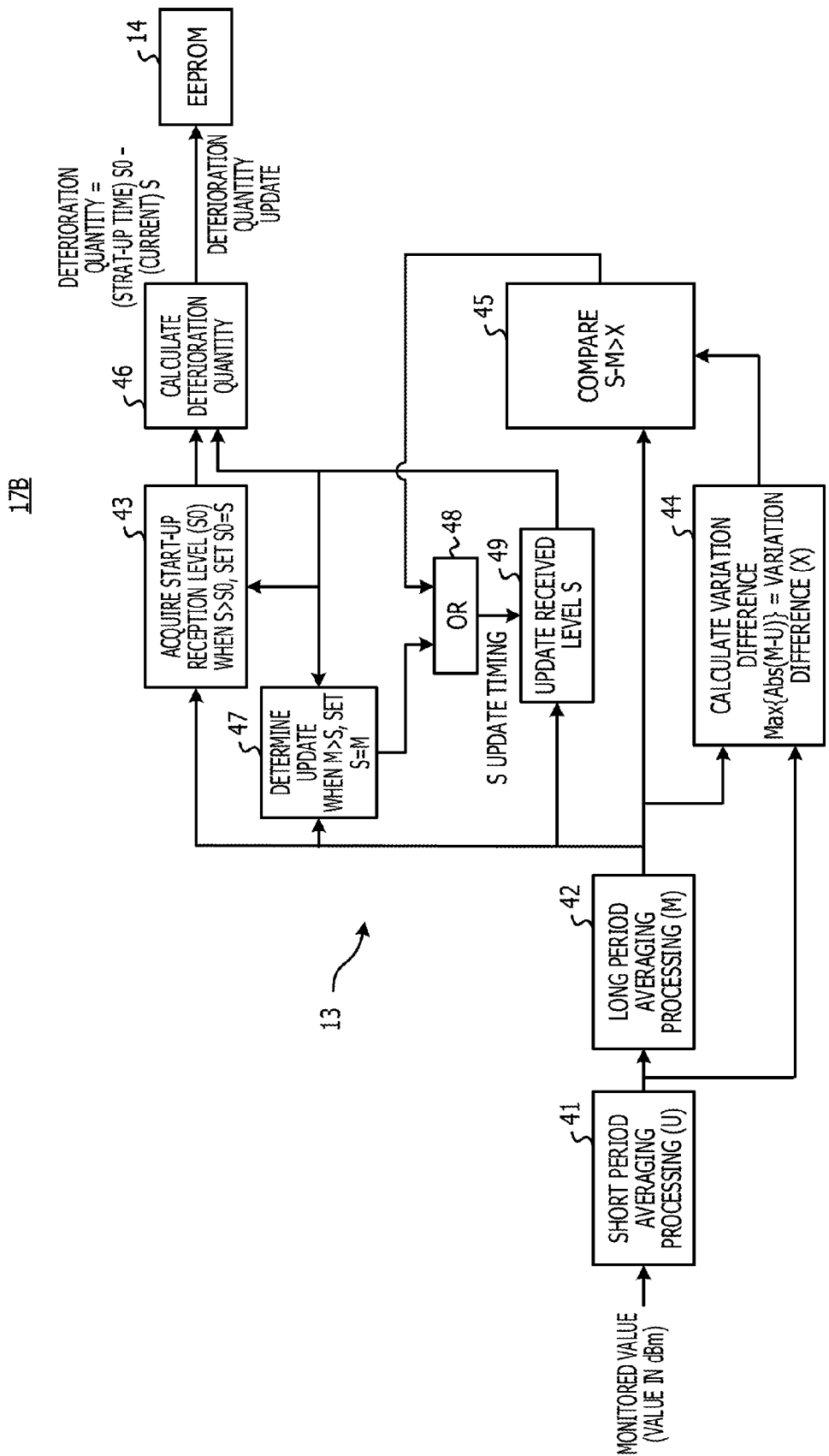
FIG. 12 illustrates another example of the deterioration quantity updating of the light source output power.

FIG. 12 illustrates an example of updating the deterioration quantity of the output power of the light source. In FIG. 12, the updating of the deterioration quantity by the light source power management unit 17B of the optical transceiver 10 is illustrated. The same reference numerals are given to substantially the same constitutional elements as or similar constitutional elements to those of FIG. 6, and the redundant descriptions thereof may be omitted or reduced. In FIG. 12, the variation in the loss of transmission path may be considered similarly as in FIG. 6. In addition to the configuration of FIG. 6, when the current monitored reception power value S becomes larger than the reception power level S0 at the time of the start-up (S>S0) or an average reception power M in a long period (which may be referred to as a "long period average M") becomes larger than the current monitored reception power value S (M>S), it is determined that the power deterioration is caused by the loss of transmission path, such that the deterioration quantity is not updated.

The light source power management unit 17B includes the short period averaging processing unit 41, the long period averaging processing unit 42, the start-up reception level acquisition unit 43, the variation difference calculation unit 44, the comparison unit 45, a deterioration quantity calculation unit 46, an update determination unit 47, an OR gate 48, a reception level update unit 49, and the EEPROM 14. The operations of the short period averaging processing unit 41, the long period averaging processing unit 42, and the variation difference calculation unit 44 are the same as those of FIG. 6. The start-up reception level acquisition unit 43 acquires the reception power level S0 at the time of the start-up from a memory, such as the EEPROM 14, and when the current reception power level "S" is larger than the reception power level S0 (S>S0), S0 is set to be updated with S, that is, S0=S. The reception level update unit 49 updates the reception power level S, which is an expectation value at the previous time, with the current reception power level according to an output of the OR gate 48.

The comparison unit 45 compares the difference (S−M) between the current reception power level S and the long period average M with the variation difference X. When the difference is larger than the variation difference, that is, S−M>X, the comparison unit 45 determines that the deterioration exists and outputs "High" to the OR gate 48. When the long period average M is larger than the current reception power level S (M>S), the update determination unit 47 updates S with M, that is, S=M, and outputs "High" to the OR gate 48.

In a case where the current reception power level S is larger than the long period average M (S>M) and the difference between the current reception power level S and the long period average M is larger than the variation difference X, since the output of the comparison unit 45 is "High" and the output of the update determination unit 47 is "Low", the output of the OR gate 48 becomes "High" and the reception level update unit 49 updates the reception power level, which satisfies S−M>X, with the current reception power level S.

In a case where the current reception power level S is smaller than the long period average M (M>S), since the output of the comparison unit 45 is "Low" and the output of the update determination unit 47 is "High", the output of the OR gate 48 becomes "High" and the reception level update unit 49 updates the previous expectation value S with the long period average M, that is, S=M.

Even though the current reception power level S is larger than the long period average M (S>M), when the difference between the current reception power level S and the long period average M is less than or equal to the variation difference X, both of the output of the comparison unit 45 and the output of the update determination unit 47 become "Low" and the reception level update unit 49 does not update the value S.

The deterioration quantity calculation unit 46 calculates the value (S0−S), which is obtained by subtracting the current reception power level S from the reception power level S0 at the time of the start-up, as the deterioration quantity at a timing when the value S is updated by the reception level update unit 49, and writes the value (S0−S) in the EEPROM 14. In a case of S>S0, since it has been set as S0=S, the deterioration quantity becomes zero and thus, the EEPROM 14 is not updated.

Therefore, in a case where the reception power level becomes larger than the initial power level due to the influence of the variation of transmission path, an erroneous updating of the deterioration quantity may be reduced.

Figure 13:
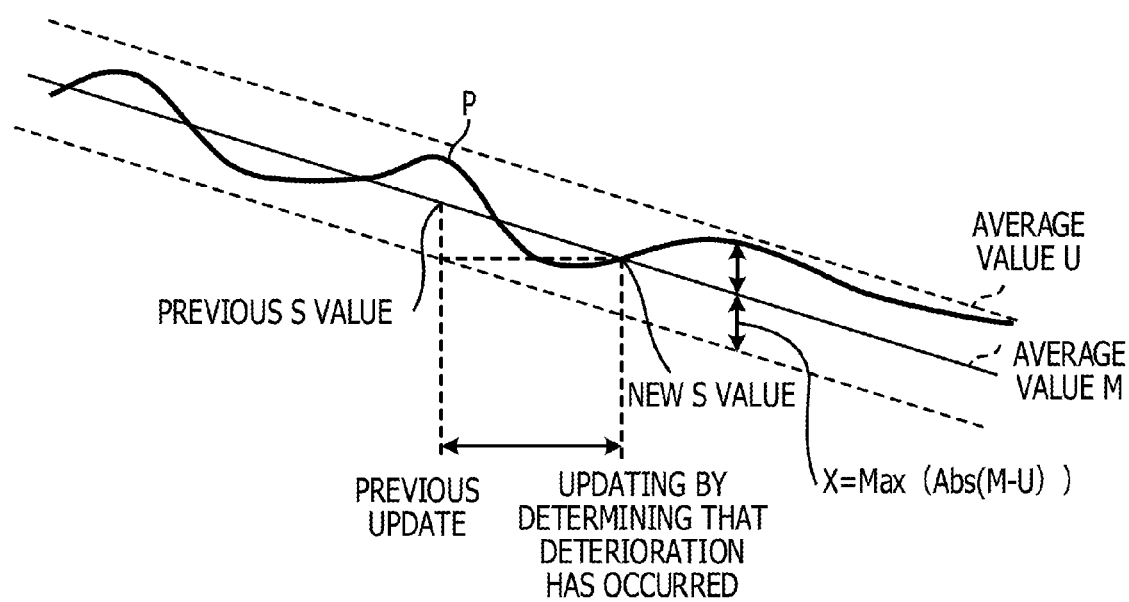
FIG. 13 illustrates an example of an update timing of a monitored reception power value.

FIG. 13 illustrates an example of an update timing of the monitored reception power value. In FIG. 13, the update timing of the monitored reception power value in the configuration illustrated in FIG. 12 is illustrated. The curve P indicates an actual variation of reception power level. The solid line and the dotted line indicate the long period average value M and the short period average value U, respectively. The distance between the solid line and the dotted line indicates the maximum variation difference X. It is assumed that the current reception power level S is updated with the long period average M, that is, S=M, by the previous update. Thereafter, when the long period average M is reduced to exceed the maximum variation difference X from the previous update, the long period average M is updated with new value of S.

Figure 14:
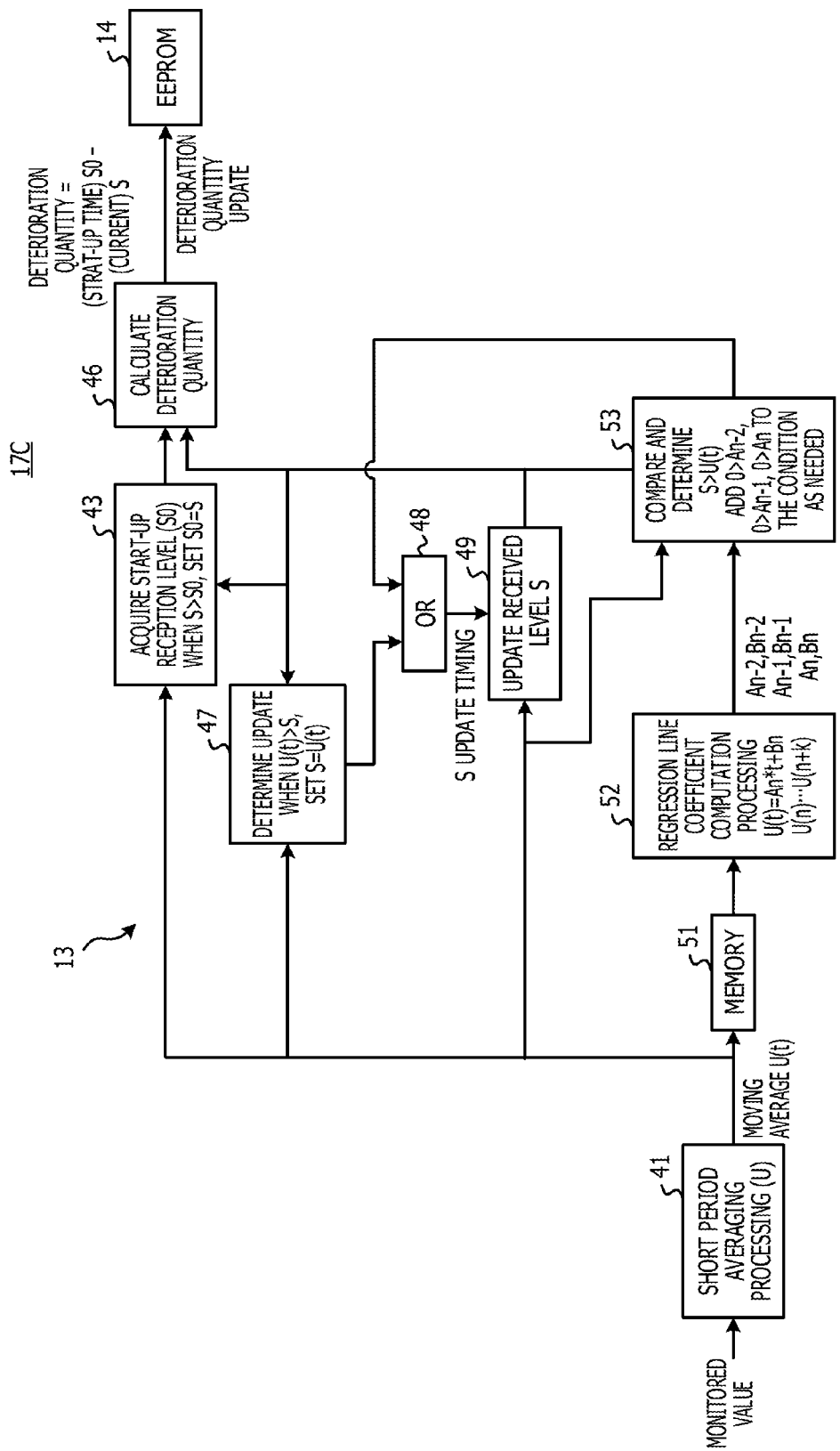
FIG. 14 illustrates another example of the deterioration quantity updating of the light source output power.

FIG. 14 illustrates an example of updating the deterioration quantity of the output power of the light source. In FIG. 14, the update of deterioration quantity by a light source power management unit 17C of the optical transceiver 10 is illustrated. The same reference numerals are given to substantially the same constitutional elements as or similar constitutional elements to those of FIG. 6 and FIG. 12, and the redundant descriptions thereof may be omitted or reduced. In FIG. 14, when a period of the long period variation becomes longer, an estimation of the variation after the long period variation is performed based on the results of the short period variation. For example, the least square method (LSM) may be used.

The light source power management unit 17C includes the short period averaging processing unit 41, the start-up reception level acquisition unit 43, the deterioration quantity calculation unit 46, the update determination unit 47, the OR gate 48, the reception level update unit 49, a memory 51, a regression line coefficient computation processing unit 52, a comparison and determination unit 53, and the EEPROM 14. For example, the light source power management unit 17C may be provided with the long period averaging processing unit 42 and the variation difference calculation unit 44 illustrated in FIG. 12.

The short period averaging processing unit 41 writes a short period average U(t) in the memory 51 at each certain time. The regression line coefficient computation processing unit 52 calculates coefficients A and B of the regression line U(t)=An×t+Bn based on short period averages U(n) to U(n+k) for a range from time t=n to time t=n+k. The comparison and determination unit 53 compares the current reception power level S with the short period average U(t) and outputs "High" when the comparison result is S>U(t). A condition that the coefficient value A of a first term of the regression line U(t)=An×t+Bn is negative may be added as needed. The condition means that a slope of the straight line is negative, for example, the reception power level varies towards a direction in which the reception power level is reduced.

When the current reception power level S is smaller than the short period average U(t) (S<U(t)), the update determination unit 47 sets S to be updated with U(t), that is, S=U(t). When the comparison result is S>U(t), the reception level update unit 49 updates the previous expectation value (S value) with the current S value, and when the comparison result is S<U(t), the reception level update unit 49 updates the S value with the U(t), according to the output of the OR gate 48. The deterioration quantity calculation unit 46 calculates a difference between the reception power level S0 at the time of the start-up and the current reception power level S as the deterioration quantity at the time when the value S is updated by the reception level update unit 49, and writes the difference in the EEPROM 14.

Figure 15:
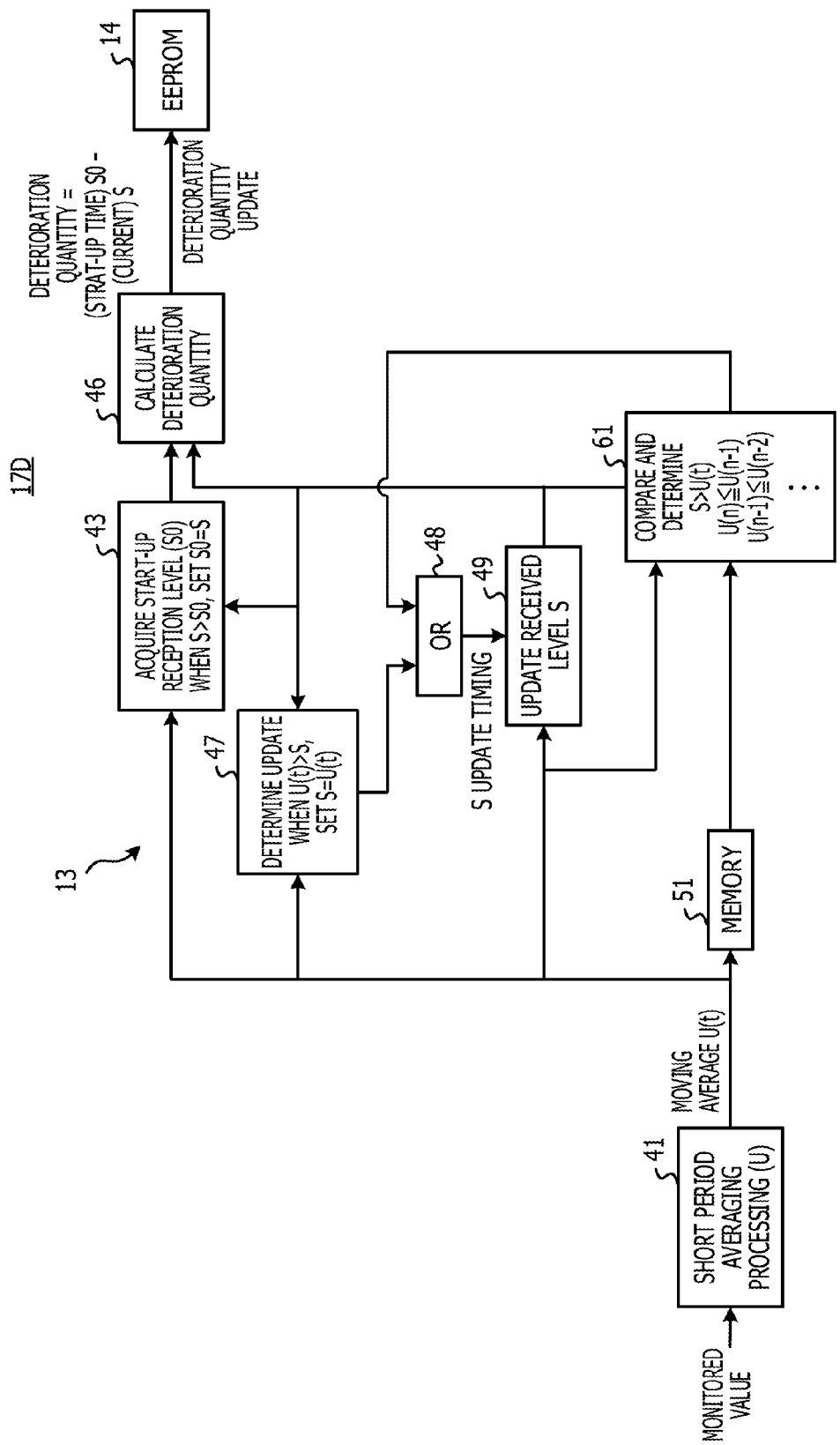
FIG. 15 illustrates another example of the deterioration quantity updating of the light source output power.

FIG. 15 illustrates an example of updating a deterioration quantity of an output power of a light source. In FIG. 15, the updating of the deterioration quantity of the light source power management unit 17D of the optical transceiver 10 is illustrated. The same reference numerals are given to substantially the same constitutional elements as or similar constitutional elements to those of FIG. 6, FIG. 12, and FIG. 14, and the redundant descriptions thereof may be omitted or reduced. In FIG. 15, the determination whether to update the deterioration quantity is made based on whether the deterioration is in a decreasing tendency by referring to past data.

A light source power management unit 17D includes the short period averaging processing unit 41, the start-up reception level acquisition unit 43, the deterioration quantity calculation unit 46, the update determination unit 47, the OR gate 48, the reception level update unit 49, a comparison and determination unit 61, and the EEPROM 14. The comparison and determination unit 61 reads the short period average U(t) obtained during a past predetermined period of time from the memory 51 and determines whether the current reception power level S is larger than the short period average U(t) and a past tendency of the short period average U(t) is in the decreasing tendency. When it is determined that S>U(t) and a changing tendency of the U(t) is in the decreasing tendency, the comparison and determination unit 61 outputs "High" to the OR gate 48.

When it is determined that U(t)<S, the update determination unit 47 updates the current reception power level S with the U(t) and outputs "High" to the OR gate 48. The subtract reception level update unit 49 updates the S value obtained at previous time with the current reception power level according to the output of the OR gate 48. The deterioration quantity calculation unit 46 calculates the difference between the reception power level S0 at the time of the start-up and the current reception power level S as the deterioration quantity at the time when the value S is updated, and writes the difference in the EEPROM 14.

Figure 16:
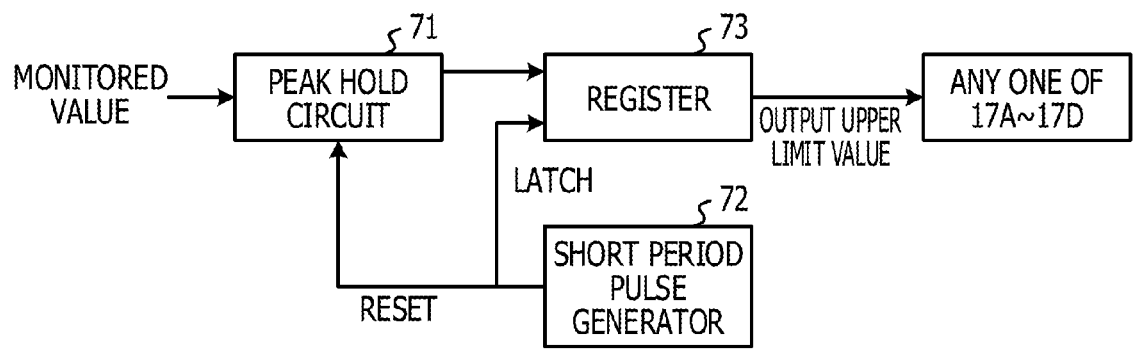
FIG. 16 illustrates another example of the deterioration quantity updating of the light source output power.

FIG. 16 illustrates an example of updating the deterioration quantity of the output power of the light source. In FIG. 16, the updating of the deterioration quantity by a light source power management unit 17E of the optical transceiver 10 is illustrated. A peak hold circuit 71 is added to the configurations illustrated in FIG. 6, FIG. 12, FIG. 14, and FIG. 15. In FIG. 16, the maximum value is introduced at each certain time and an averaging processing is performed on the introduced maximum values, instead of averaging the monitored value. The malfunction may be further reduced.

At the rise or fall timing of a pulse output of the short period pulse generator 72, the peak hold circuit 71 is reset and the maximum value of the reception power level S is introduced into a register 73. The reset and the introduction may be performed contemporaneously. The register 73 outputs an upper limit value as an input value to the configurations illustrated in FIG. 6, FIG. 12, FIG. 14, and FIG. 15. Therefore, the malfunction by which the reduction of the reception power level caused by the variation of transmission path is input by being regarded as the deterioration of the light source may be reduced.

Figure 17:
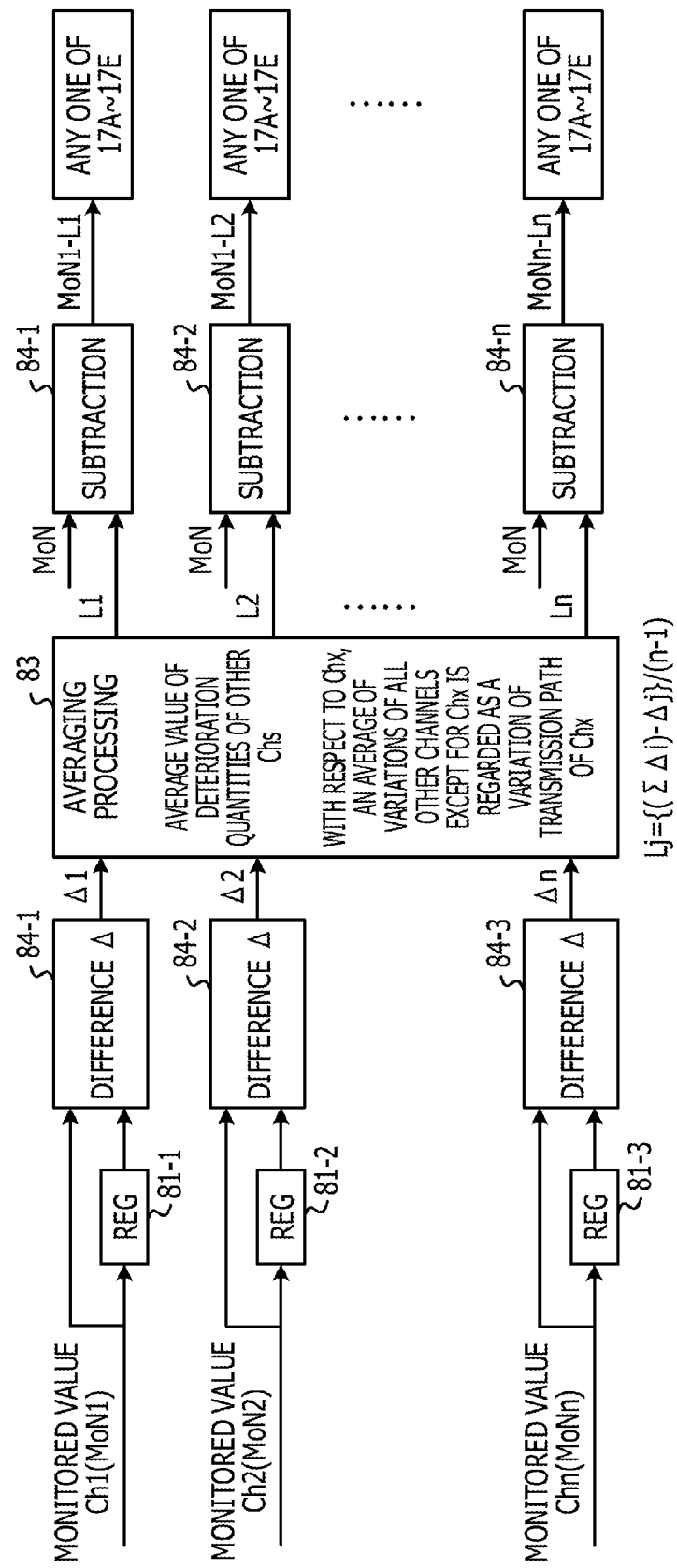
FIG. 17 illustrates another example of the deterioration quantity updating of the light source output power.

FIG. 17 illustrates an example of updating the deterioration quantity of the output power of the light source. In FIG. 17, the update of deterioration quantity by a light source power management unit 17F of the optical transceiver 10 is illustrated. In a multi-channel (multi-frequency) transmission in which a VCSEL array is used as the laser light source 33, the long period variation is removed from the monitored value of each channel.

The monitored values of the reception power levels input for the channels are maintained in registers 81-1 to 81-$n$, respectively. The difference calculate circuits 82-1 to 82-$n$ output the differences $\Delta 1$ to $\Delta n$ between the current input monitored value and the monitored values maintained in the registers 81-1 to 81-$n$ to an averaging processing unit 83. The averaging processing unit 83 calculates an average of variations of other channels with respect to each channel. For example, the averaging processing unit 83 calculates an average of variations L1 of channels 2 to n with respect to a channel 1 and an average of variations L2 of the channel 1 and the channels 3 to n with respect to the channel 2, and outputs the calculated results to corresponding subtractors 84-1 to 84-$n$, respectively. An average of variations L of all other channels may be regarded as a variation of the transmission path of a channel of interest.

The subtractors 84-1 to 84-$n$ each subtracts the average of variations L of other channels from the input monitored value for the channel and inputs the subtraction result to the short period averaging processing unit 41 of each of the light source power management units 17A to 17E. Accordingly, the monitored value may be used in a state where the long period variation is removed in advance. In a case of the multi-channel transmission in a single mode, since the signal is propagated in the same mode, an influence by the variation of transmission path is also similar and thus, the variation of transmission path and the deterioration of light source may be similarly distinguished. Even when a multi-core fiber is used, since all the cores have the similar tendency to a cyclic of transmission loss, the similar story may be suitable.

Figure 18:
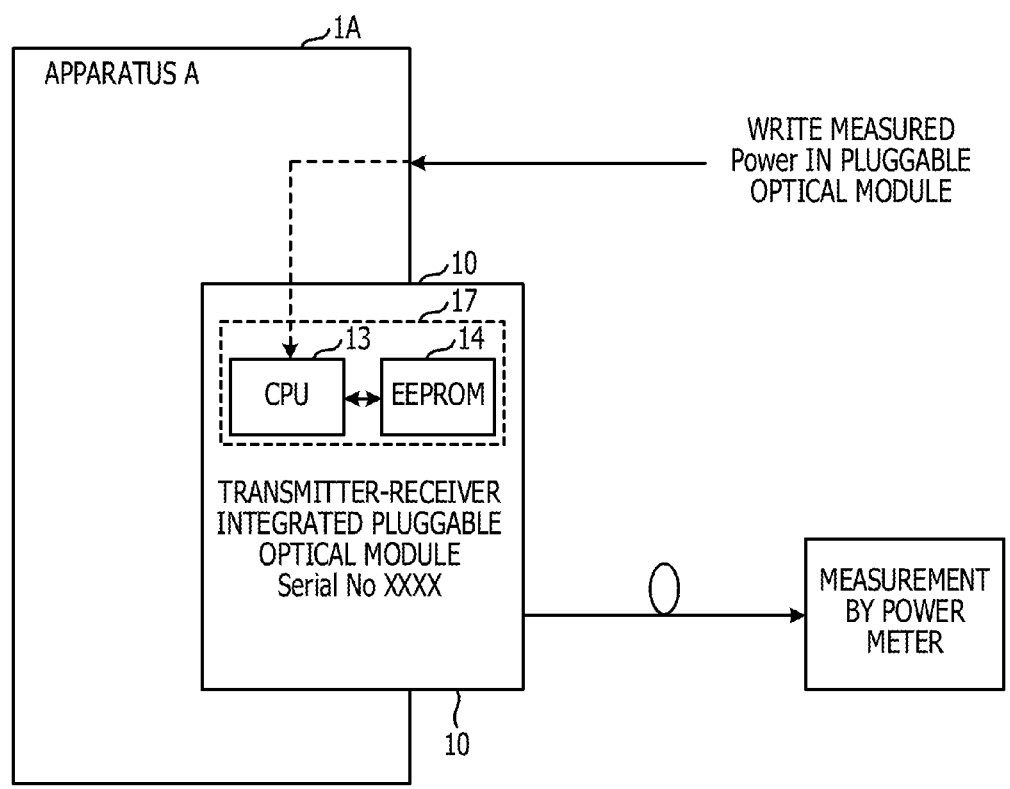
FIG. 18 illustrates an example of a correction function for a deterioration quantity.

FIG. 18 illustrates an example of a correction function for a deterioration quantity. In FIG. 18, a correction function for the deterioration quantity to be written into the EEPROM 14 is illustrated. When the monitored value of the reception power level is received from a counterpart optical transceiver, the CPU 13 of the optical transceiver 10 reads the power level at the time of shipment from the EEPROM 14, and when the difference between the received monitored value and the read power level, which corresponds to the deterioration quantity, is positive, for example, when the monitored value is smaller than the power level at the time of shipment, overwrites the deterioration quantity in the EEPROM 14. When the difference corresponding to the deterioration quantity is negative, for example, when the monitored value is larger than the power level at the time of shipment, the negative deterioration quantity may be regarded as being caused by the influence of the variation in loss of transmission path and the deterioration quantity may not be updated. In a case where the transmission path 5 such as the optical fiber cable is replaced due to the deterioration, the current output power of the light source of the optical transceiver 10 may be measured by, for example, an external power meter at the time of the replacement of the transmission path, and the current deterioration quantity written in the EEPROM 14 may be corrected with the value measured by the power meter.

Figure 19:
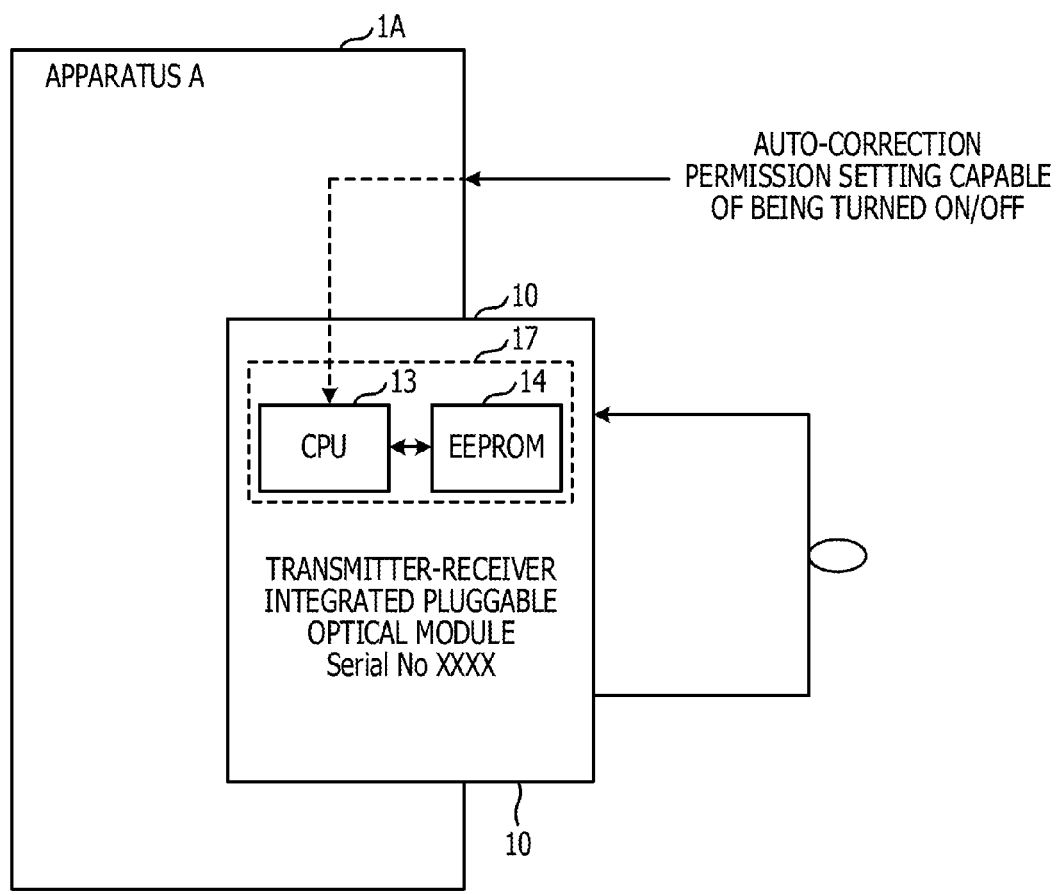
FIG. 19 illustrates an example of correcting a deterioration quantity at the time of a self-loopback.

FIG. 19 illustrates an example of correcting a deterioration quantity at the time of a self-loopback. As described with reference to FIG. 4 and FIG. 5, the optical transceiver 10 exchanges the identification information with the counterpart optical transceiver and then determines the link before monitoring the reception power level. In this case, when the received identification information is only composed of the identification information of its own device, the optical transceiver 10 is shifted to a self-loopback mode as illustrated in FIG. 19. When the self-loopback is performed using the optical fiber for which a loss may be negligible, the output power level of the laser light source 33 of its own device is measured in the reception power monitoring unit 29 provided in the optical transceiver 10 itself even without using an external power meter. For this reason, when the self-loopback is detected, the current deterioration quantity written in the EEPROM 14 may be corrected using the measurement value by the reception power monitoring unit 29. In a case of the self-loopback mode, the I-L curve indicating a relationship between a drive current and a light emission quantity may be measured by varying the deterioration quantity of the output power as well as the electrical current of the laser light source 33 of its own device. Accordingly, abnormality in the laser light source 33 may be detected at an early stage.

Figure 20:
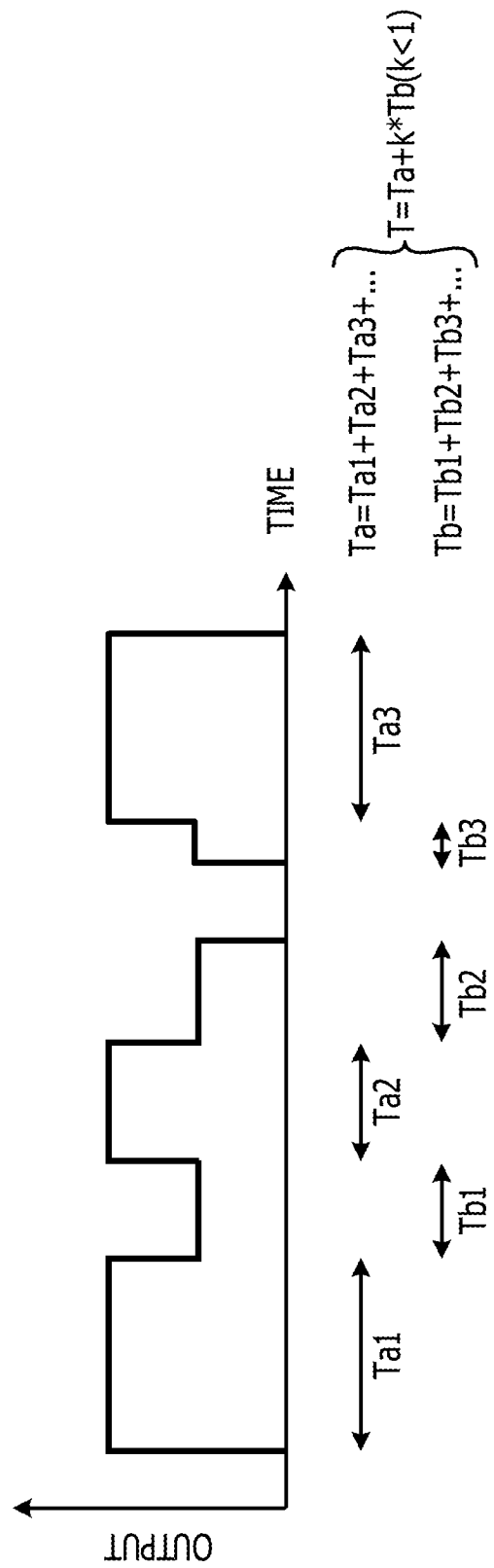
FIG. 20 illustrates an example of a light emitting time counting.

FIG. 20 illustrates an example of counting a light emitting time. An accumulated time Ta during which the laser light source 33 is in a normal output state and an accumulated time Tb during which the laser light source 33 is in a lower output level for reduction of the deterioration of the light source, reduction of an occurrence of error of the deterioration quantity, safety of a laser and so on, are counted. When a ratio of an acceleration coefficient at the time of the lower level output and an acceleration coefficient at the time of the normal output is defined as k, the operating time T is computed by an equation of T=Ta+k×Tb (k<1). The operating time T and the deterioration quantity of the laser light source 33 are written into the EEPROM 14 to be managed, such that a time to manage and exchange the laser light source 33 may be easily anticipated.

At the time when the signal is communicated between the optical transmission apparatuses 1A, 1B using the optical transceiver (pluggable optical module) 10, the reception side monitors the reception power of the optical signal sent from the counterpart optical transmission apparatus (transmission side) and notifies the counterpart optical transmission apparatus of the monitoring information. The optical transceiver 10 of the transmission side distinguishes the variation of the transmission path and the deterioration of light source based on the received monitoring information and writes the deterioration quantity of the output power of the light source of its own device in a rewritable memory to manage the deterioration quantity. Accordingly, even when the automatic power control is not performed, the maintenance of the light source may be performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical transceiver comprising:
a light source;
a light source power management unit configured to manage a state of an output power of the light source;
an optical detector configured to receive a first optical signal from a counterpart optical transmission apparatus and detect the first optical signal; and
a monitoring information extraction unit configured to extract a monitoring information of a reception power level of a second optical signal, which is generated from an output light of the light source and received in the counterpart optical transmission apparatus, from the first optical signal, wherein the light source power management unit is configured to update a written value of the state of the output power of the light source based on a monitored value of the reception power level included in the monitoring information,
wherein the light source power management unit is configured to update the written value of the state of the output power of the light source in a case where the monitored value is decreased to exceed a variation of an optical transmission path.

2. The optical transceiver according to claim 1, wherein the light source power management unit is configured to update the written value of the state of an output power of the light source by determining that the output power of the light source is deteriorated in a case where a change in the monitored value is larger than the maximum difference between a short period average of the reception power level and a long period average of the reception power level.

3. The optical transceiver according to claim 1, wherein the light source power management unit is configured not to update the written value of the state of the output power of the light source in a case where the monitored value varies to exceed a value within a period of time.

4. The optical transceiver according to claim 1, wherein the light source power management unit is configured not to update the written value of the state of the output power of the light source in a case where the monitored value increases.

5. The optical transceiver according to claim 1, wherein the light source power management unit is configured to write an initial reception power level at the time of a start-up or at the time of a connection and replace the monitored value with the initial reception power level in a case where the monitored value is larger than the initial reception power level.

6. The optical transceiver according to claim 1, wherein the optical detector is configured to receive the first optical signal after first identification information is exchanged between the optical transceiver and the counterpart optical transmission apparatus and a bidirectional link is established, and the light source power management unit is configured to compare a pair of second identification information included in the monitoring information with a pair of the first identification information stored in a memory of the optical transceiver, and update the written value of the state of the output power of the light source when the pairs of identification information are identical with each other.

7. The optical transceiver according to claim 1, wherein the optical detector is configured to receive the first optical signal after first identification information is exchanged between the optical transceiver and the counterpart optical transmission apparatus and a bidirectional link is established, and the light source power management unit is configured to detect a self-loopback path, measure the reception power level of the first optical signal, and correct the written value of the state of the output power of the light source in a case where second identification information included in the monitoring information indicates only the optical transceiver.

8. The optical transceiver according to claim 1, wherein the light source power management unit is configured to output an alarm in a case where an accumulated deterioration quantity of the output powers of the light source exceeds a value.

9. The optical transceiver according to claim 1, wherein the light source power management unit is configured to maintain the output power of the light source at an output level lower than an output power level during an optical communication in a case where the optical transceiver is not coupled.

10. The optical transceiver according to claim 1, wherein the light source power management unit is configured to distinguish a deterioration of an output of the light source over a variation of an optical transmission path using least-square method or a direction of change in the previous reception power level using a short period variation in the reception power level in a case where a period of a long period variation in the reception power level is relatively long.

11. The optical transceiver according to claim 1, wherein the light source power management unit is configured to use, as the monitored value, a value obtained by subtracting an average of variations of all other channels from a monitored value of a single channel in a case of a multichannel transmission.

12. An optical transmission system comprising:
a first optical transmission apparatus; and
a second optical transmission apparatus coupled with the first optical transmission apparatus through an optical transmission path,
wherein the second optical transmission apparatus is configured to monitor a reception power level of an optical signal transmitted from the first optical transmission apparatus and notify the first optical transmission apparatus of monitoring information, and the first optical transmission apparatus is configured to update a written state of an output power of a light source of the first optical transmission apparatus based on the monitoring information,
wherein the first optical transmission apparatus is configured to update the written state of the output power of the light source in a case where a monitored value included in the monitoring information is decreased to exceed a variation of an optical transmission path.

13. The optical transmission system according to claim 12, wherein the first optical transmission apparatus is configured to update the written state of the output power of the light source by determining that the output power of the light source is deteriorated in a case where a change in a monitored value included in the monitoring information is larger than the maximum difference between a short period average of the reception power level and a long period average of the reception power level.

14. The optical transmission system according to claim 12, wherein the first optical transmission apparatus is configured not to update the written state of the output power of the light source in a case where a monitored value included in the monitoring information varies to exceed a value within a period of time.

15. A light source output monitoring method comprising:
managing a state of an output power of a light source of a first optical transmission apparatus in a first optical transmission apparatus;
receiving a first optical signal transmitted from a counterpart second optical transmission apparatus by the first optical transmission apparatus;
extracting monitoring information relating to a reception power level of a second optical signal, which is transmitted from the first optical transmission apparatus and received in the second optical transmission apparatus, from the first optical signal; and
updating a written state of the output power of the light source based on the monitoring information,
wherein the written state of the output power of the light source is updated in a case where a monitored value included in the monitoring information is decreased to exceed a variation of an optical transmission path.

16. The light source output monitoring method according to claim 15, wherein the written state of the output power of the light source is updated by determining that the output power of the light source is deteriorated in a case where a change in a monitored value included in the monitoring information is larger than the maximum difference between a short period average of the reception power level and a long period average of the reception power level.

17. The light source output monitoring method according to claim 15, wherein the written state of the output power of the light source is not updated in a case where a monitored value included in the monitoring information varies to exceed a value within a period of time.

* * * * *